United States Patent [19]

Roffman et al.

[11] Patent Number: 5,684,560
[45] Date of Patent: Nov. 4, 1997

[54] CONCENTRIC RING SINGLE VISION LENS DESIGNS

[75] Inventors: Jeffrey H. Roffman; Edgar V. Menezes, both of Jacksonville, Fla.

[73] Assignee: Johnson & Johnson Vision Products, Inc., Jacksonville, Fla.

[21] Appl. No.: 433,842

[22] Filed: May 4, 1995

[51] Int. Cl.$^6$ .............................. G02C 7/04; G02C 7/02; A61F 2/16
[52] U.S. Cl. .............................. 351/160 R; 351/160 H; 351/176; 623/6
[58] Field of Search .................. 351/160 R, 160 H, 351/161, 176, 177; 623/6

[56] References Cited

U.S. PATENT DOCUMENTS

| | | | |
|---|---|---|---|
| 4,564,484 | 1/1986 | Neefe | 264/2.6 |
| 4,580,882 | 4/1986 | Nuchmann | 351/161 |
| 4,890,912 | 1/1990 | Visser | 351/161 |
| 5,050,981 | 9/1991 | Roffman | 351/177 |
| 5,152,787 | 10/1992 | Hamblen | 623/6 |
| 5,181,053 | 1/1993 | Brown | 351/161 |
| 5,217,489 | 6/1993 | Van Noy et al. | 623/6 |
| 5,220,359 | 6/1993 | Roffman | 351/177 |
| 5,225,858 | 7/1993 | Portney | 351/161 |

FOREIGN PATENT DOCUMENTS

WO 92/17134  10/1992  WIPO.

*Primary Examiner*—Georgia Y. Epps
*Assistant Examiner*—Jordan M. Schwartz

[57] ABSTRACT

Concentric ring, single vision lens designs are disclosed which improve the depth-of-focus of the lens relative to current spherical contact lenses or intraocular lenses by placing at least one additional peripheral optical radius on the front or back surface of the lens. A plurality of concentric annular rings are provided in the periphery of the optic zone of the lens. The arrangement of optic powers in the concentric annular rings includes a mixture of the basic spherical refractive power and other annular rings with less plus or greater minus spherical refractive power, arranged to mediate spherical aberrations and improve visual acuity. The concentric annular ring design corrects peripheral, aperture-dependent ocular aberrations in a discrete, zonal fashion.

14 Claims, 3 Drawing Sheets

CONCENTRIC RING SINGLE VISION LENS DESIGNS

BACKGROUND OF THE INVENTION

1. Field of the Invention

The present invention relates generally to concentric ring, single vision lens designs. More particularly, the subject invention pertains to concentric ring, single vision lens designs which improve the depth-of-focus of the lens relative to current spherical single vision contact lenses or intraocular lenses by using a plurality of additional optical radii of curvature on a peripheral area of the lens.

2. Discussion of the Prior Art

Current prior art contact lens or intraocular lens designs attempt to correct for refractive (spherical) error by using one radius of curvature on each of the front and back optical surfaces of the lens. One disadvantage of this prior art approach is that light rays passing through the peripheral areas of the lens tend to focus in the eye in front of those passing through the center of the lens. This prior art approach restricts its depth-of-focus or field, and the quality of the optical image formed.

In the prior art as exemplified by U.S. Pat. Nos. 5,050,981 and 5,220,359, it has been shown that by using an in vivo ocular image quality measurement device, such as an in vivo modulation transfer function (MTF) measurement device, ocular aberrations can be reduced which results in an increase in visual acuity and performance.

U.S. Pat. No. 5,181,053 to Brown discloses a multifocal contact lens having a spherical curve in the center region of the concave surface and an aspheric curve which surrounds the center spherical region. The center spherical region improves distance night vision by providing a spherical center in the optical zone through which the eye sees far distant objects, compensating for the expansion of the eye pupil at night into radially distant areas of the aspheric curve having greater aspheric curvature for near vision and less curvature of the aspheric curve closer to the central spherical region. One major disadvantage of this contact lens design is the use of corrective aspheric radii, which are difficult to measure and manufacture in practice.

SUMMARY OF THE INVENTION

Accordingly, it is a primary object of the present invention to provide multiple concentric ring, single vision lens designs which improve the depth-of-focus and image quality of the lens relative to current spherical single vision contact lenses or intraocular lenses by placing at least one additional peripheral optical radius on the front or back surface of the lens.

A further object of the subject invention is the provision of concentric ring, single vision lens designs which provides at least one, and preferably a plurality of, concentric annular rings in the periphery of the optic zone of the lens. The arrangement of optic powers in the concentric annular rings includes a mixture of the basic spherical refractive power and other annular rings with less plus or greater minus spherical refractive power, arranged to mediate spherical aberrations and improve visual acuity. The concentric annular ring design corrects peripheral, aperture-dependent ocular aberrations in a discrete, zonal fashion. It can also eliminate the use of corrective aspheric radii as in the Brown patent, which are difficult to measure and manufacture in practice.

In a typical eye, ocular aberrations increase as the diameter of the pupil aperture increases. The present invention compensates for this effect by designed changes in the spherical radius, in concentric annular zones, as the diameter of the pupil aperture increases. In contact lenses, the concentric annular rings are preferably placed on the rear surface of the contact lenses to minimize flare and glare problems which might be encountered if the concentric annular rings were placed on the front surface thereof.

The method of selection of the power/radius changes in the concentric annular rings can be from empirical patient data, classified into types, or the result of computer optical ray tracing, wherein the (spherical) aberration is compensated for in concentric annular rings, or the result of direct in vivo measurement of ocular aberrations by a suitable apparatus such as an aberroscope or MTF point spread device, such that in vivo lenses can be specifically tailored to an individual, or are the result of analyzing the patient population as a whole for classification into inventory stock keeping unit types.

In accordance with the teachings herein, the present invention provides a concentric annular ring, single vision lens which focuses light rays passing through the periphery of the lens at or near the same focal plane as light rays passing through the center of the lens, thereby improving its depth-of-focus and image quality. The lens comprises a front surface and an opposite back surface, and one of the front and back surfaces defines a central area comprising a circular disc having a spherical surface corresponding to a basic prescription Rx spherical refractive power. A plurality of annular rings surround the central area, and have a combination of the basic prescriptive spherical refractive power and a less plus or greater minus spherical refractive power, to mediate spherical aberration and improve visual acuity.

In greater detail, the lens can comprise a contact lens to be worn on the cornea of the eye, particularly a soft hydrogel contact lens, or an intraocular lens. The central area and the annular rings are preferably formed on the back surface of a contact lens to minimize flare and glare problems. In different embodiments, the plurality of annular rings have less plus spherical power for a hyperopic prescription, or greater minus spherical power for a myopic prescription. In preferred embodiments, the central area is surrounded by a plurality of alternating sphere power and sphere' power annular rings, wherein the sphere' power comprises a spherical power which is less plus or more minus than the spherical power of the central area. Moreover, the widths of individual annular rings can be different to generate a power profile which varies to generate different amounts of minus power with increasing distance from the center.

Moreover, ocular in vivo image quality measurement devices can be used to optimize the ocular image quality in the concentric annular ring designs to produce even more improved designs. This is accomplished by using an in vivo image quality measurement device, such as an aberroscope or MTF point spread measuring device, to measure and decrease the sum of the aberrations of the combination of the concentric lens and the eye system.

The present invention also provides a method of designing a concentric annular ring, single vision lens as described herein which comprises performing an in vivo image quality analysis with an in vivo quality analysis instrument of a first design of the lens on the eye to measure residual aberrations, and then redesigning the lens to reduce the measured residual aberrations and improve visual acuity and performance. The redesign of the lens can include aspherizing the surface opposite the surface defining the central area and the plurality of annular rings, or by the addition of more minus power spherical annular rings. Moreover, an aberroscope or MTF point spread measuring device is preferably utilized to measure the modulation transfer function of the combination of the lens and eye.

BRIEF DESCRIPTION OF THE DRAWINGS

The foregoing objects and advantages of the present invention for concentric single vision lens designs may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
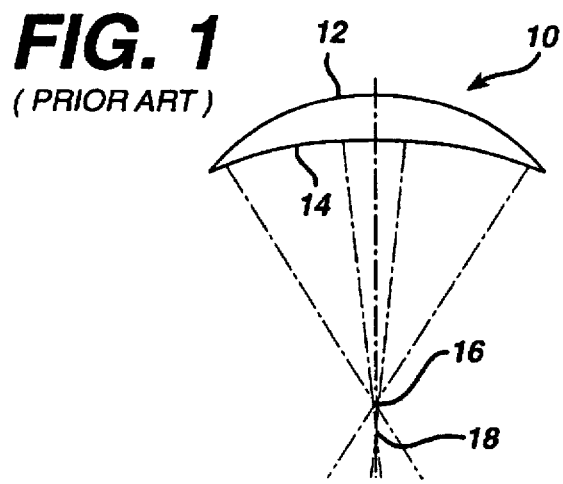
FIG. 1 illustrates a typical prior art design which corrects for refractive error by using one radius of curvature for each of the front and back optical surfaces of the lens.

Referring to the drawings in detail, FIG. 1 illustrates a typical prior art lens design 10 which corrects for refractive error by using one radius of curvature for each of the front and back optical surfaces 12, 14 of the lens 10. A disadvantage of this prior art approach is that light rays passing through the peripheral areas of the lens tend to focus in the eye at 16 in front of those passing through the center of the lens which focus at 18, as illustrated by the ray traces in FIG. 1. This prior art approach restricts the optical quality of the lens, and therefore its depth-of-focus.

According to the teachings of the present invention, at least one peripheral optical curve, and preferably several, are added to the peripheral areas of the front or back optical surface of the lens in order to refocus the peripheral rays to the same focal point or plane as the central rays.

Figure 2:
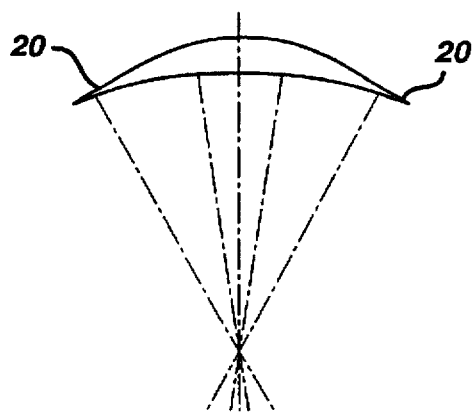
FIG. 2 illustrates a peripheral optical curve added to the front optical surface of a lens, pursuant to the teachings of the present invention, in order to refocus the peripheral rays to the same focal point or plane as the central rays.
Figure 3:
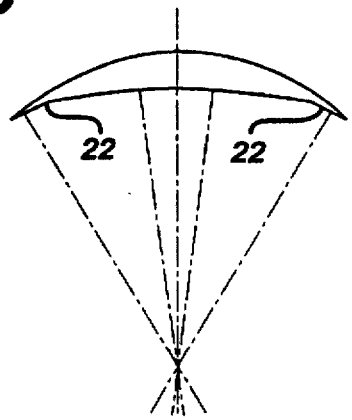
FIG. 3 illustrates a peripheral optical curve added to the back optical surface of a lens.

FIG. 2 illustrates a peripheral optical curve 20 added to the front optical surface of a lens in order to refocus the peripheral rays to the same focal point or plane as the central rays. FIG. 3 illustrates a peripheral optical curve 22 added to the rear optic surface of a lens in order to refocus the peripheral rays to the same focal point or plane as the central rays.

In FIG. 2 the peripheral optical curve is flatter than the primary optical curve, and in FIG. 3 the peripheral optical curve is steeper than the primary optical curve. Placing the peripheral optical curve on the back surface is preferable for contact lenses to minimize flare and glare problems as might be encountered in embodiments wherein the peripheral optical curve is placed on the front surface of the lens.

In preferred embodiments, the present invention uses a plurality of concentric annular rings surrounding a central circular region to provide a design which improves the clinical visual performance of standard single vision contact or intraocular lenses. In preferred embodiments, the central area is a circular disc containing the basic prescribed spherical power which is surrounded by a plurality of alternating sphere power and sphere' power annular rings, wherein the sphere' power is less plus (for hyperopic prescriptions) or more minus (for myopic prescriptions) than the central spherical power.

In an alternate embodiment, the central area is a circular disc with the basic distance prescription surrounded by a plurality of annular rings with increasing values of optical power, increasingly more minus or less plus as the radius increases from the center to provide a systematic change of power.

Figure 4:
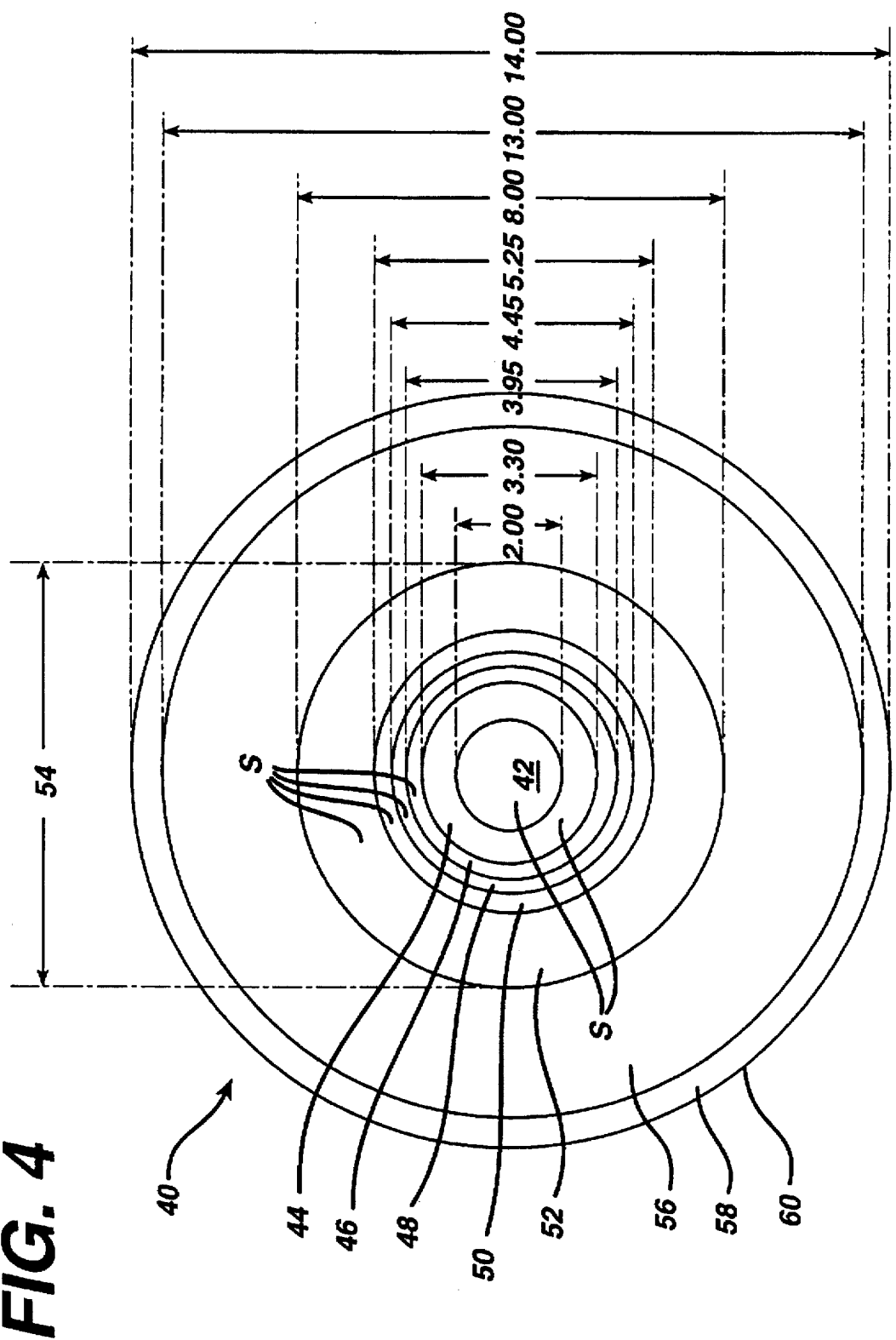
FIG. 4 is a top plan view of one design of a preferred type of embodiment of a lens designed pursuant to the teachings of the present invention which has a central area with a circular disc containing the basic prescribed spherical power, surrounded by a plurality of alternating sphere power and sphere' power annular rings, wherein the sphere' power is less plus (for hyperopia) or more minus (for myopia) than the central spherical power.

FIG. 4 illustrates a preferred type of embodiment of a lens 40 designed pursuant to the teachings of the present invention wherein a central area 42 is a circular disc containing the basic prescribed spherical power, and is surrounded by a plurality of alternating sphere power and sphere' power annular rings 44, 46, 48, 50 and 52. The sphere' powers are basically spherical (as opposed to aspherical) powers, and are less plus for hyperopic prescriptions and more minus for myopic prescriptions than the basic spherical power prescription in the central disc.

Figure 5:
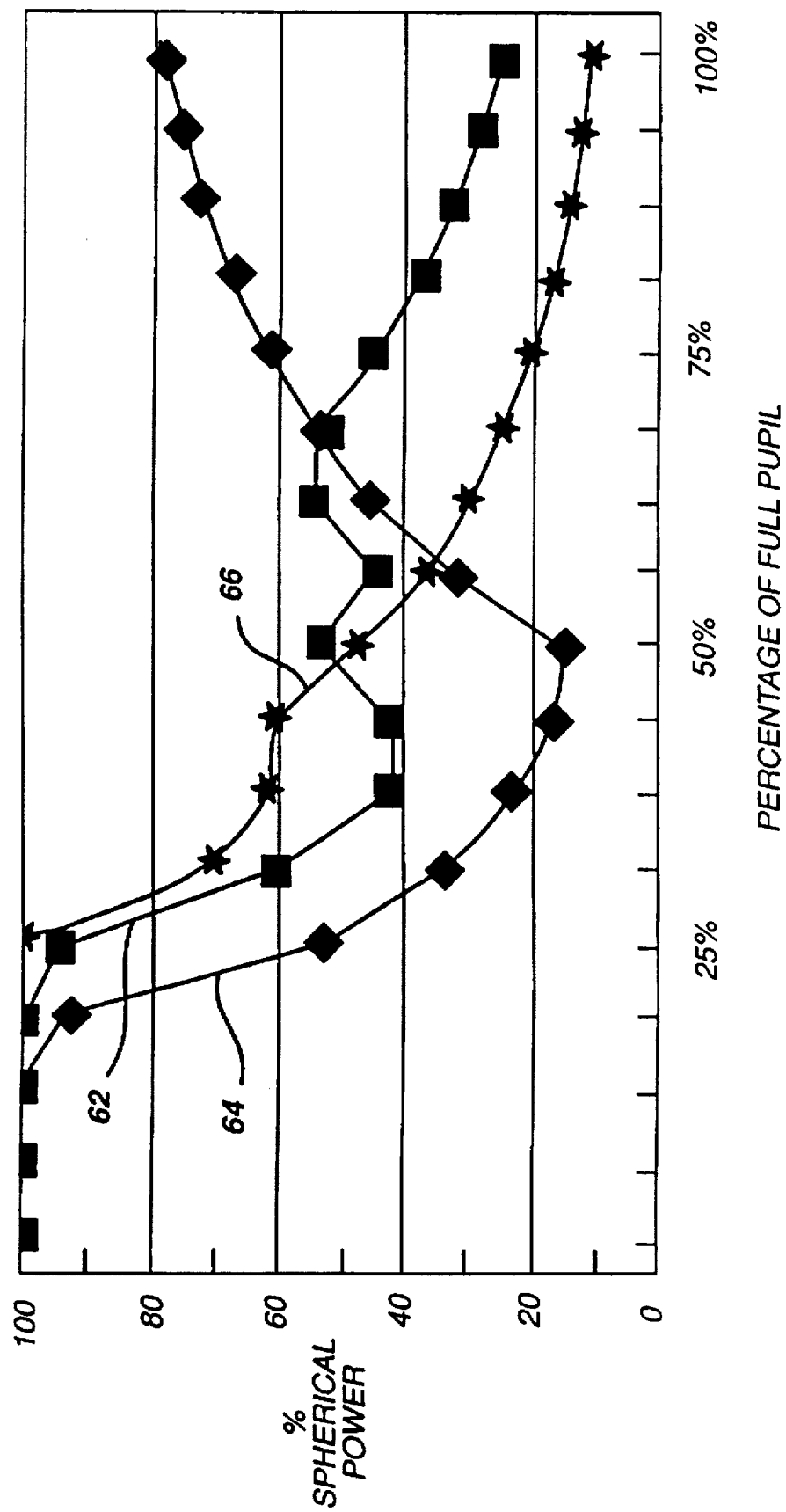
FIG. 5 illustrates graphs for three different embodiments of lenses of the percentage of the basic spherical power prescription versus the percentage of full pupil, with 100% of the full pupil covering the entire optical area of the lens and lesser percentages being restricted increasingly to the central circular disc portion of the lens.

By varying the widths of individual annular rings in the alternating regions, a power profile, as illustrated in FIG. 5, can be created which includes greater amounts of minus power with increasing distance from the center of the lens. The combined areas of the center spherical disc 42 and the surrounding annular rings 44 through 52 comprise the active optical area 54 of the lens, which is surrounded by a lenticular or peripheral (nonoptical) area 56 which is beveled at its outer circumference at 58 to an outer circumferential edge 60.

FIG. 5 illustrates graphs for three different embodiments of lenses of the percentage of the basic spherical optical power prescription, which ranges from 100% where the pupil diameter size is restricted to only the central circular disc, to lower percentages when the outer annular rings are added for larger pupil diameter sizes. The abscissa is the percentage of full pupil, with 100% covering the entire optical area of the lens and lesser percentages being restricted increasingly to the central circular disc portion of the lens.

The lens design of FIG. 4 is represented by the graph 62 (with squares) which starts at the upper left with 100% spherical power, which corresponds to the central disc 42 which covers approximately 15% of the total area of the optical area 54. As the percentage of the full pupil increases, first area 44, then area 46, and then area 48, etc. contribute to the optical power until 100% of the full pupil is reached which corresponds to 100% of the optical area 54.

Graph 64 of FIG. 5 (with diamonds) illustrates another embodiment of a lens design wherein the optical power of the lens dips below 20% of the basic spherical power at 50% of full pupil, and then increases again to approximately 80% of the basic spherical power at 100% of full pupil.

Graph 66 of FIG. 5 (with stars) illustrates a further embodiment of a lens design wherein the optical power of the lens starts at 100% of the basic spherical power at the center of the lens on the left side of the graph, and then progressively drops as the percentage of full pupil increases, to approximately 10% of the basic spherical prescription at 100% of full pupil.

Graph 66 should be similar to a graph for the alternate embodiment mentioned hereinabove wherein the central area is a circular disc with the basic distance prescription surrounded by a plurality of annular rings with increasing or changing values of optical power, increasingly more minus or less plus as the radius increases from the center to provide a systematic change of power.

The lenses of the present invention function by mediating the spherical aberration of the patient's eye. Since the combination of a contact lens and an eye system is always a net positive system, the polarity of the designs of the present invention does not change if the contact lens power is plus or minus.

One object of the present invention is to start with concentric annular ring multifocal lens designs as illustrated in FIGS. 2-5, and then use in vivo image quality analysis equipment, such as an aberroscope or MTF point spread apparatus, to evaluate, identify and quantify any residual aberrations. These residual aberrations can then be reduced further by aspherization of preferably the nonconcentric surface of the lens, or alternatively by aspherization of the concentric surface of the lens, to improve visual performance and acuity.

Thus, the present invention provides an improvement in the performance of designs for spherical ametropia, presbyopia, or astigmatism which is accomplished by a reduction of aberrations of the combination of the lens and the eye system. The reduction in aberrations does not correct the ametropia by itself. First, a subject (or population) is fitted with a concentric lens, and then the subject (or population) is tested with an in vivo image quality device to determine residual aberrations with the lens in place on the eye. Next, the lens is redesigned, such as by the addition of more minus power spherical annular rings, to decrease the measured residual aberrations.

Obviously, many different embodiments of the present invention are possible, with alterations of the number of annular rings, the widths and arrangement of the annular rings, and the optical powers assigned to each of the annular rings.

While several embodiments and variations of the present invention for concentric single vision lens designs are described in detail herein, it should be apparent that the disclosure and teachings of the present invention will suggest many alternative designs to those skilled in the art.

What is claimed is:

1. A concentric annular ring, single vision lens which focuses light rays passing through annular portions of the periphery of the lens at the same focal plane as light rays passing through the center of the lens, thereby increasing the quality of the lens image and improving its depth-of-focus, comprising:
   a. a single vision lens, said lens having a front surface and an opposite back surface, wherein one of the front and back surfaces defines a central area comprising a circular disc having a surface corresponding to a basic prescriptive spherical refractive power which focuses light rays passing through said central area at a particular focal plane; and
   b. a plurality of annular rings surrounding the central area, some of which comprise sphere power annular rings which have a surface corresponding to the basic prescriptive spherical refractive power and some of which comprise sphere' power annular rings which have a surface corresponding to a less plus or greater minus refractive power relative to said basic prescriptive spherical refractive power, whereby light rays passing through said sphere' power annular rings are focused at the same focal plane as light rays passing through said central area to mediate spherical aberration and improve visual acuity, and whereby light rays passing through said sphere power annular rings will focus in front of light rays passing through said central area.

2. A concentric annular ring, single vision lens with improved depth-of-focus as claimed in claim 1, wherein the plurality of annular rings comprise spherical annular rings.

3. A concentric annular ring, single vision lens with improved depth-of-focus as claimed in claim 2, wherein the circular disc has a spherical curve.

4. A concentric annular ring, single vision lens with improved depth-of-focus as claimed in claim 1, wherein the plurality of annular rings comprise aspheric annular rings.

5. A concentric annular ring, single vision lens with improved depth-of-focus as claimed in claim 4, wherein the circular disc has an aspheric curve.

6. A concentric annular ring, single vision lens with improved depth-of-focus as claimed in claim 1, wherein the lens comprises a contact lens to be worn on the cornea of the eye.

7. A concentric annular ring, single vision lens with improved depth-of-focus as claimed in claim 6, wherein the contact lens comprises a soft hydrogel contact lens.

8. A concentric annular ring, single vision lens with improved depth-of-focus as claimed in claim 1, wherein the lens comprises an intraocular lens.

9. A concentric annular ring, single vision lens with improved depth-of-focus as claimed in claim 1, wherein all of said sphere' power annular rings have a surface corresponding to a less plus refractive power relative to said basic prescriptive spherical refractive power for a hyperopic prescription.

10. A concentric annular ring, single vision lens with improved depth-of-focus as claimed in claim 1, wherein all of said sphere' power annular rings have a surface corresponding to a greater minus refractive power relative to said basic prescriptive spherical refractive power for a myopic prescription.

11. A concentric annular ring, single vision lens with improved depth-of-focus as claimed in claim 1, wherein said sphere power and sphere' power annular rings alternate.

12. A concentric annular ring, single vision lens with improved depth-of-focus as claimed in claim 11, wherein the widths of individual annular rings are different to generate a power profile which varies to generate different amounts of minus power with increasing distance from the center.

13. A concentric annular ring, single vision lens with improved depth-of-focus as claimed in claim 1, wherein the central area and the plurality of annular rings are formed on the back surface of the lens to minimize flare and glare problems.

14. A concentric annular ring, single vision lens with improved depth-of-focus as claimed in claim 1, wherein the plurality of sphere' power annular rings have increasing values of optical power, increasingly more minus or less plus as the radius increases from the center to provide a systematic change of power.

* * * * *